US012675253B2

(12) United States Patent
Liao

(10) Patent No.: US 12,675,253 B2
(45) Date of Patent: Jul. 7, 2026

(54) SCREEN PROJECTION METHOD, VIDEOCONFERENCING DEVICE, AND SYSTEM

(71) Applicant: YEALINK (XIAMEN) NETWORK TECHNOLOGY CO., LTD., Xiamen (CN)

(72) Inventor: Zhiqiang Liao, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 19/031,361

(22) Filed: Jan. 18, 2025

(65) Prior Publication Data

US 2025/0165210 A1 May 22, 2025

Related U.S. Application Data

(63) Continuation-in-part of application No. PCT/CN2024/102747, filed on Jun. 29, 2024.

(30) Foreign Application Priority Data

Jun. 30, 2023 (CN) .......................... 202310799244.X

(51) Int. Cl.
G06F 3/14 (2006.01)
H04N 7/15 (2006.01)
H04N 21/41 (2011.01)
(52) U.S. Cl.
CPC ............. G06F 3/1454 (2013.01); H04N 7/15 (2013.01); H04N 21/4122 (2013.01)

(58) Field of Classification Search
CPC .... G06F 3/1454; H04N 7/15; H04N 21/4122; H04N 7/147; H04N 21/4223;
(Continued)

(56) References Cited

U.S. PATENT DOCUMENTS

2012/0287222 A1* 11/2012 Liu ...................... H04N 23/698
348/14.07

FOREIGN PATENT DOCUMENTS

CN 101764989 A 6/2010
CN 107357585 A * 11/2017 ............... H04N 7/15
(Continued)

OTHER PUBLICATIONS

International Search Report of PCT Patent Application No. PCT/CN2024/102747 issued on Aug. 19, 2024.

*Primary Examiner* — Towfiq Elahi

(57) ABSTRACT
The present disclosure provides a screen projection method, a videoconferencing device, and a system. The screen projection method includes: receiving a to-be-projected video stream sent by a screen projection initiator; decoding the to-be-projected video stream to generate a plurality of to-be-projected images; creating a virtual camera to enable a videoconferencing screen projection application to control the virtual camera through a standard camera interface to collect each to-be-projected image; and performing screen projection on the collected to-be-projected image by the videoconferencing screen projection application. The present disclosure can enable the videoconferencing screen projection application to interface with an operating system through a standard wireless screen projection collection interface to obtain the to-be-projected image for screen projection.

12 Claims, 3 Drawing Sheets

(58) Field of Classification Search
CPC ....... H04N 21/43637; H04N 21/44016; H04N
21/4431; H04N 21/4307; H04N 19/42
See application file for complete search history.

(56) References Cited

FOREIGN PATENT DOCUMENTS

| | | | | | | |
|---|---|---|---|---|---|---|
| CN | 113225477 | A | * | 8/2021 | ............. | H04N 23/80 |
| CN | 113438442 | A | | 9/2021 | | |
| EP | 4180944 | A1 | * | 5/2023 | ............. | G06F 3/147 |

* cited by examiner

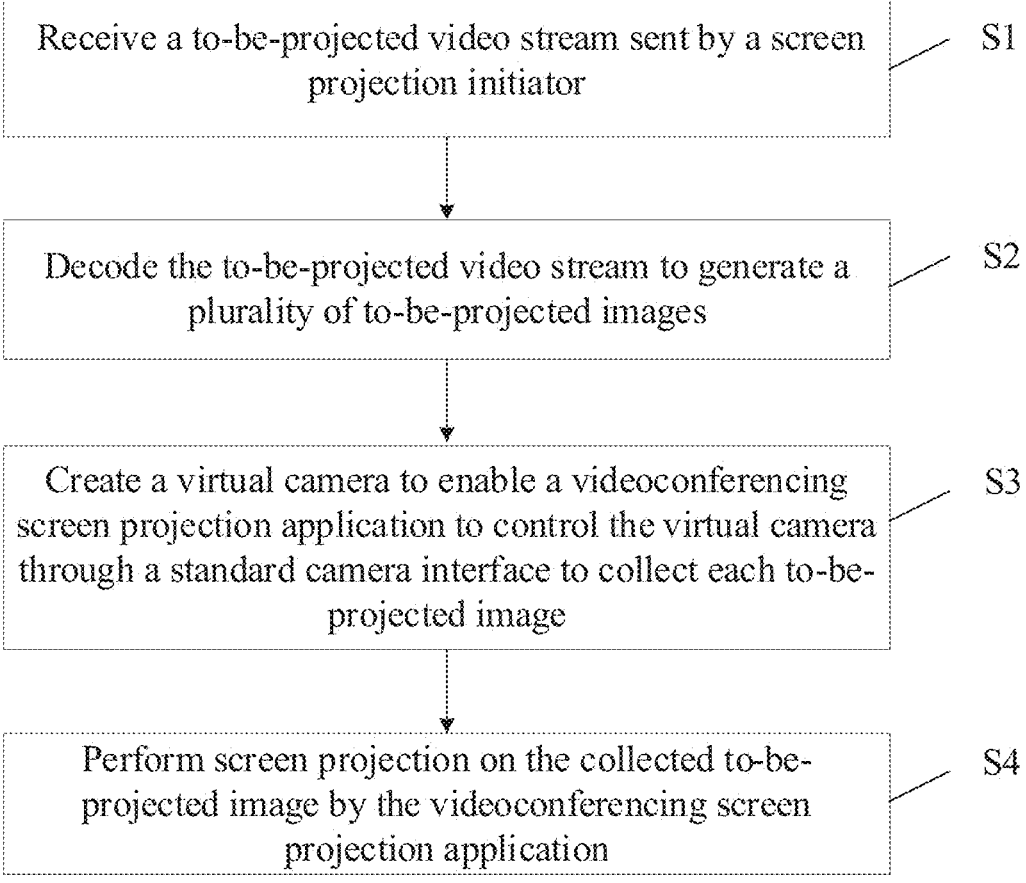

Receive a to-be-projected video stream sent by a screen projection initiator — S1

Decode the to-be-projected video stream to generate a plurality of to-be-projected images — S2

Create a virtual camera to enable a videoconferencing screen projection application to control the virtual camera through a standard camera interface to collect each to-be-projected image — S3

Perform screen projection on the collected to-be-projected image by the videoconferencing screen projection application — S4

FIG. 1

SCREEN PROJECTION METHOD, VIDEOCONFERENCING DEVICE, AND SYSTEM

CROSS-REFERENCE TO RELATED APPLICATIONS

The present application is a Continuation-In-Part Application of PCT Application No. PCT/CN2024/102747 filed on Jun. 29, 2024, which claims the benefit of Chinese Patent Application No. 202310799244.X filed on Jun. 30, 2023, the contents of which are hereby incorporated by reference.

TECHNICAL FIELD

The present disclosure relates to the field of screen projection in videoconferencing applications, and in particular, to a screen projection method, a videoconferencing device, and a system.

BACKGROUND

Nowadays, on the market, a videoconferencing screen projection application is interfaced with a wireless screen projection protocol to receive a video stream, so as to obtain a wireless to-be-projected image. The videoconferencing screen projection application needs to have a capability of processing the video stream. Alternatively, a screen projection initiator is required to transmit the video stream to an operating system for processing, and then a processed video stream is sent to the videoconferencing screen projection application. However, the process also needs to consider how video streams of different protocols on the videoconferencing screen projection application are interfaced with the operating system. As a result, different codes need to be developed for the videoconferencing screen projection application to interface with the operating system, greatly increasing a difficulty of developing the videoconferencing screen projection application. Therefore, how to reduce the difficulty of developing the videoconferencing screen projection application is an urgent problem that needs to be solved.

SUMMARY

The present disclosure provides a screen projection method, a videoconferencing device, and a system, that can enable a videoconferencing screen projection application to interface with an operating system through a standard wireless screen projection collection interface to obtain a to-be-projected image for screen projection.

The present disclosure provides a screen projection method, including: receiving a to-be-projected video stream sent by a screen projection initiator;

decoding the to-be-projected video stream to generate a plurality of to-be-projected images;

creating a virtual camera to enable a videoconferencing screen projection application to control the virtual camera through a standard camera interface to collect each of the to-be-projected images; and performing screen projection on the collected to-be-projected image by the videoconferencing screen projection application.

Further, the receiving a to-be-projected video stream sent by a screen projection initiator includes:

establishing a protocol interaction with the screen projection initiator based on a screen projection protocol to which the to-be-projected video stream belongs; and after establishing the protocol interaction, receiving the to-be-projected video stream sent by the screen projection initiator.

Further, the standard camera interface includes camera api2.

Further, the screen projection method includes: when detecting that to-be-projected video streams sent by a plurality of screen projection initiators are received, decoding each of the to-be-projected video streams to generate a plurality of to-be-projected images corresponding to each of the to-be-projected video streams;

splicing to-be-projected images that are at a same time point among the to-be-projected video streams to generate a plurality of spliced to-be-projected images;

creating one virtual camera to enable the videoconferencing screen projection application to control the one virtual camera through the standard camera interface to collect the spliced to-be-projected images; and performing the screen projection on the collected spliced to-be-projected images by the videoconferencing screen projection application.

Further, the screen projection method includes: when detecting that to-be-projected video streams sent by a plurality of screen projection initiators are received, decoding each of the to-be-projected video streams to generate a plurality of to-be-projected images corresponding to each of the to-be-projected video streams;

creating a virtual camera corresponding to each of the to-be-projected video streams, to enable the videoconferencing screen projection application to control each virtual camera through the standard camera interface to collect a plurality of to-be-projected images of a corresponding to-be-projected video stream; and performing, by the videoconferencing screen projection application, the screen projection on the to-be-projected images collected by each virtual camera on independent display areas.

Based on the above method embodiment, the present disclosure correspondingly provides a device embodiment.

The present disclosure provides a videoconferencing device. The videoconferencing device is configured to execute the screen projection method in the present disclosure.

Based on the above method embodiment, the present disclosure correspondingly provides a system embodiment.

The present disclosure provides a screen projection system, including a screen projection initiator and the videoconferencing device provided in the device embodiment of the present disclosure.

The screen projection initiator is configured to send a to-be-projected video stream to the videoconferencing device.

The embodiments of the present disclosure have following beneficial effects:

The present disclosure provides a screen projection method. The screen projection method includes: receiving a to-be-projected video stream sent by a screen projection initiator; decoding the to-be-projected video stream to generate a plurality of to-be-projected images; creating a virtual camera to enable a videoconferencing screen projection application to control the virtual camera through a standard camera interface to collect each to-be-projected image; and performing screen projection on the collected to-be-projected images. The present disclosure can enable the videoconferencing screen projection application to interface with an operating system through a standard wireless screen projection collection interface to obtain the to-be-projected images for screen projection, thereby reducing a difficulty of developing the videoconferencing screen projection application.

BRIEF DESCRIPTION OF THE DRAWINGS

FIG. 1 is a schematic flowchart of a screen projection method according to an embodiment of the present disclosure;

DETAILED DESCRIPTION OF THE EMBODIMENTS

Figure 2:
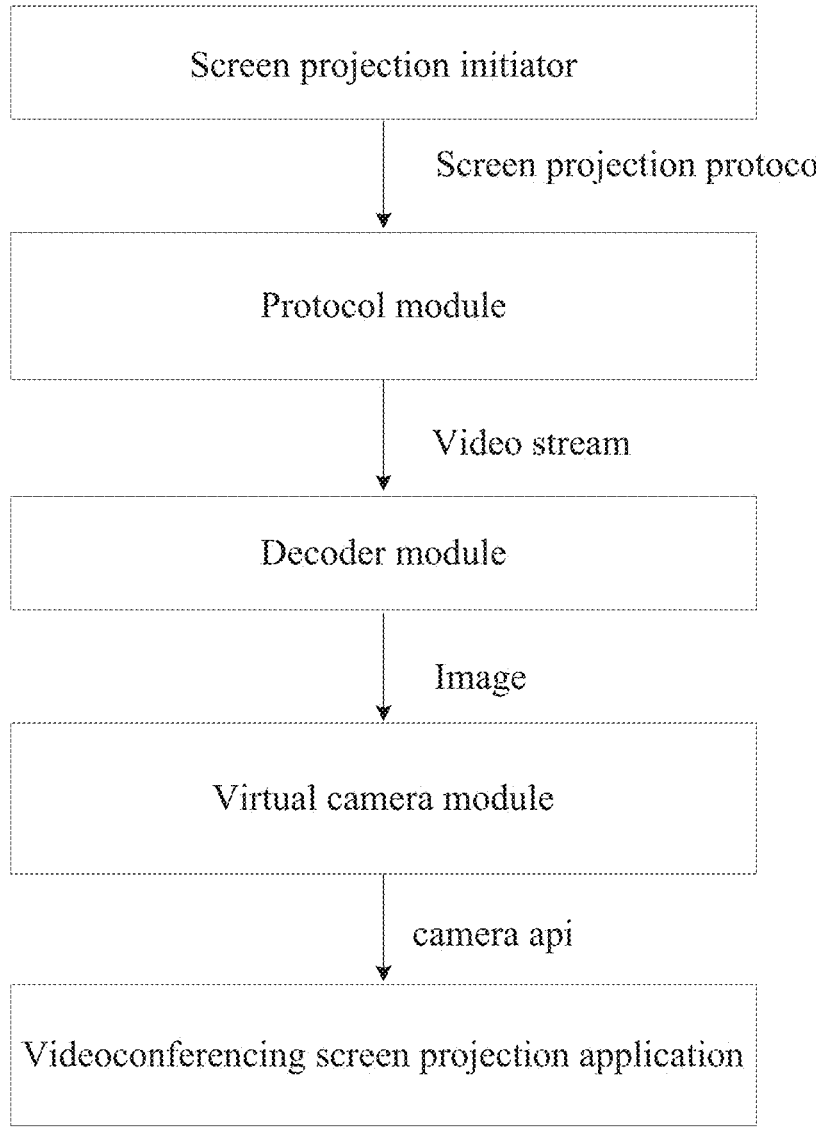
FIG. 2 is a schematic diagram of a processing process of screen projection according to an embodiment of the present disclosure.

The technical solutions in the present disclosure are clearly and completely described below with reference to the accompanying drawings in the present disclosure. Apparently, the described embodiments are only a part rather than all of the embodiments of the present disclosure. All other embodiments obtained by those skilled in the art based on the embodiments of the present disclosure without creative efforts shall fall within the protection scope of the present disclosure.

As shown in FIG. 1, an embodiment provides a screen projection method, including following steps:

Step S1: Receive a to-be-projected video stream sent by a screen projection initiator.

Step S2: Decode the to-be-projected video stream to generate a plurality of to-be-projected images.

Step S3: Create a virtual camera to enable a videoconferencing screen projection application to control the virtual camera through a standard camera interface to collect each to-be-projected image.

Step S4: Perform screen projection on the collected to-be-projected image by the videoconferencing screen projection application.

In a preferred embodiment, the receiving a to-be-projected video stream sent by a screen projection initiator in the step S1 includes:

establishing a protocol interaction with the screen projection initiator based on a screen projection protocol to which the to-be-projected video stream belongs; and after establishing the protocol interaction, receiving the to-be-projected video stream sent by the screen projection initiator.

Specifically, initiating the screen projection by the screen projection initiator may be initiating wireless screen projection on a mobile phone or computer, and the used screen projection protocol may be airplay, miracast, or the like. Firstly, a videoconferencing device establishes the protocol interaction with the screen projection initiator based on the screen projection protocol of the to-be-projected video stream of the screen projection initiator, and obtains the to-be-projected video stream from the screen projection initiator after establishing the protocol interaction. The videoconferencing device can process various protocols including the airplay and the miracast.

For the step S2, in an optional embodiment, after the videoconferencing device receives the to-be-projected video stream from the screen projection initiator, a decoder module of the videoconferencing device decodes the received to-be-projected video stream into the images.

For the steps S3 and S4, in an optional embodiment, the standard camera interface includes camera api2.

Specifically, the videoconferencing device creates the virtual camera that adapts to a standard api publicly available on an operating system platform where the videoconferencing device is located, such as the camera api2 on an Android system. The api is commonly used in the industry. The videoconferencing screen projection application collects the images on the one virtual camera through a standard camera api operation. These images are obtained by the virtual camera from an output of the image decoder module, and the videoconferencing screen projection application then presents these images to a user.

In a preferred embodiment, when it is detected that to-be-projected video streams sent by a plurality of screen projection initiators are received, each to-be-projected video stream is decoded to generate a plurality of to-be-projected images corresponding to each to-be-projected video stream.

To-be-projected images that are at a same time point among the to-be-projected video streams are spliced to generate a plurality of spliced to-be-projected images.

One virtual camera is created to enable the videoconferencing screen projection application to control the one virtual camera through the standard camera interface to collect the spliced to-be-projected images. The screen projection is performed on the collected spliced to-be-projected images by the videoconferencing screen projection application.

Specifically, the videoconferencing device can simultaneously process a plurality of protocols, in other words, can establish protocol interactions with the screen projection initiators, and after establishing the protocol interactions, can also simultaneously receive the to-be-projected video streams sent by the screen projection initiators. The decoder module decodes the to-be-projected video stream sent by each screen projection initiator to obtain a corresponding image of each screen projection initiator, and then splices the image of each screen projection initiator based on a same start time, in other words, splices a plurality of screens into one screen. The one virtual camera is established, and the videoconferencing screen projection application controls the one virtual camera through the standard camera interface to collect the spliced to-be-projected image, and presents the collected image to the user.

In a preferred embodiment, when it is detected that to-be-projected video streams sent by a plurality of screen projection initiators are received, each to-be-projected video stream is decoded to generate a plurality of to-be-projected images corresponding to each to-be-projected video stream.

A virtual camera corresponding to each to-be-projected video stream is created, to enable the videoconferencing screen projection application to control each virtual camera through the standard camera interface to collect a plurality of to-be-projected images of a corresponding to-be-projected video stream. By the videoconferencing screen projection application, the screen projection is performed on the to-be-projected images collected by each virtual camera on independent display areas of the videoconferencing device.

Specifically, the videoconferencing device can simultaneously process a plurality of protocols and establish protocol interactions with the screen projection initiators, which is the same as that in the previous embodiment. Different from the previous embodiment, after receiving and decoding the to-be-projected video streams sent by the screen projection initiators, a plurality of virtual cameras are established for the images corresponding to the screen projection initiators, in other words, each virtual camera corresponds to an image of one screen projection initiator. The videoconferencing screen projection application then controls each virtual camera to collect the image of the corresponding screen projection initiator, and displays the images collected by each virtual camera on multiple independent screens of the videoconferencing device.

Based on the above method embodiment, the present disclosure correspondingly provides a device embodiment.

Another embodiment of the present disclosure provides a videoconferencing device. The videoconferencing device is configured to implement the screen projection method in the present disclosure.

For an illustrative purpose, as shown in FIG. 2, the videoconferencing device is equipped with a protocol module, a decoder module, a virtual camera module, and a videoconferencing screen projection application (videoconferencing screen projection App).

A screen projection initiator initiates screen projection, and the protocol module of the videoconferencing device establishes a protocol interaction with the screen projection initiator based on a protocol to which a video stream of the screen projection initiator belongs, and receives the video stream sent by the screen projection initiator. The protocol module transmits the video stream to the decoder module, and the decoder module decodes the to-be-projected video stream to obtain a plurality of to-be-projected images. The virtual camera module establishes a virtual camera that adapts to a standard api publicly available on a corresponding operating system platform, such as camera api2 on an Android system. The videoconferencing screen projection application only needs to control the virtual camera through the standard camera api to collect the to-be-projected images, so as to perform the screen projection on the collected to-be-projected images. This simplifies an interfacing process between the videoconferencing screen projection application and an operating system of the videoconferencing device, without a need to develop additional codes to interface with different protocols or process the video stream, greatly reducing a difficulty of developing the videoconferencing screen projection application.

Previously, the protocol module is disposed on the videoconferencing screen projection application. Each videoconferencing screen projection application on the videoconferencing device requires a protocol module and a capability of processing the video stream, or needs to transmit the video stream to the operating system for processing and then receives a processed video stream. If the videoconferencing screen projection application transmits the video stream to the operating system for processing and then receives the processed video stream, it is necessary to consider how video streams of different protocols on the videoconferencing screen projection application are interfaced with the operating system. If the videoconferencing screen projection application itself processes the video stream, the videoconferencing screen projection application needs to have many functions, such as an ability to establish protocol interactions with different screen projection initiators, and an ability to process images of different protocols. These functions need to be developed for each videoconferencing screen projection application, greatly increasing the development difficulty.

Based on the above device embodiment, the present disclosure correspondingly provides a system embodiment.

Figure 3:
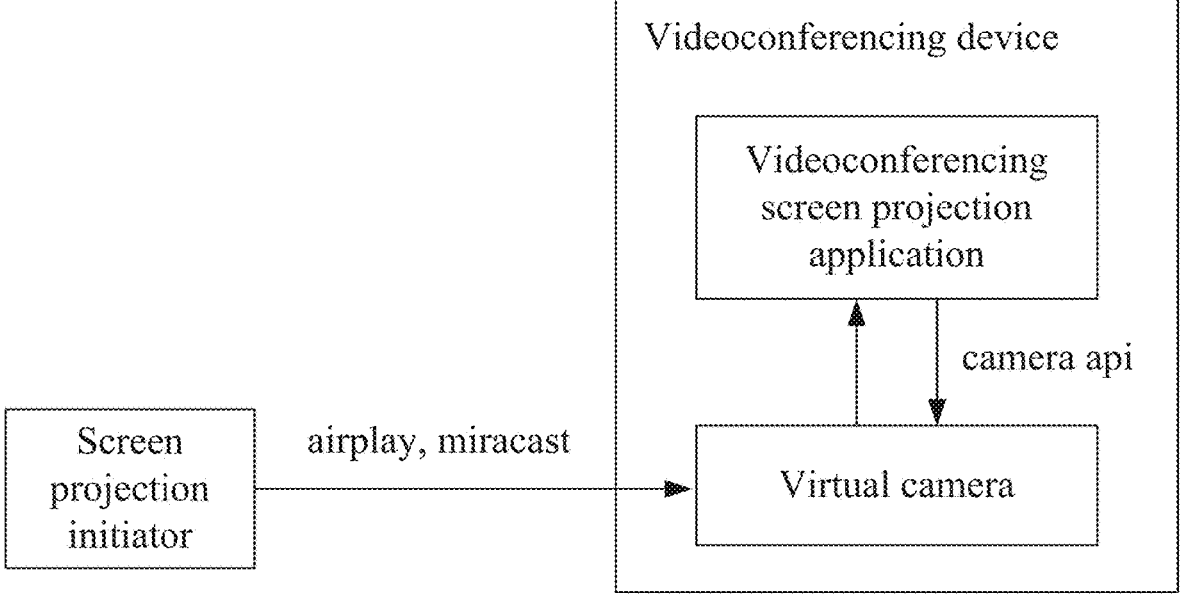
FIG. 3 is a schematic diagram of a screen projection system according to an embodiment of the present disclosure.

As shown in FIG. 3, another embodiment of the present disclosure provides a screen projection system, including a screen projection initiator and the videoconferencing device provided in the device embodiment. The screen projection initiator is configured to send a to-be-projected video stream to the videoconferencing device.

Specifically, the screen projection initiator is configured to initiate screen projection to the videoconferencing device, which may mean initiating wireless screen projection on a mobile phone or computer, and then establishing a protocol interaction between the videoconferencing device and the mobile phone. The videoconferencing device can process various protocols including airplay and miracast. After the protocol interaction is established, the videoconferencing device obtains the to-be-projected video stream sent by the screen projection initiator. After the videoconferencing device decodes the video stream into a plurality of to-be-projected images, a videoconferencing screen projection application in the videoconferencing device collects the to-be-projected images through a virtual camera module, and then performs the screen projection on the collected to-be-projected images.

According to the above embodiments of the present disclosure, the videoconferencing device can process the video stream and various protocols. In this way, combined with a virtual camera technology, the videoconferencing screen projection application can be interfaced with the operating system through a standard wireless screen projection collection interface to obtain the to-be-projected image for the screen projection, reducing the difficulty of developing the videoconferencing screen projection application.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

The invention claimed is:

1. A screen projection method, comprising:
receiving a to-be-projected video stream sent by a screen projection initiator;
decoding the to-be-projected video stream to generate a plurality of to-be-projected images;
creating a virtual camera to enable a videoconferencing screen projection application to control the virtual camera through a standard camera interface to collect each of the to-be-projected images; and
performing screen projection on the collected to-be-projected image by the videoconferencing screen projection application;
wherein the screen projection method further comprises:
when detecting that to-be-projected video streams sent by a plurality of screen projection initiators are received, decoding each of the to-be-projected video streams to generate a plurality of to-be-projected images corresponding to each of the to-be-projected video streams;
creating a virtual camera corresponding to each of the to-be-projected video streams, to enable the videoconferencing screen projection application to control each virtual camera through the standard camera interface to collect a plurality of to-be-projected images of a corresponding to-be-projected video stream; and performing, by the videoconferencing screen projection application, the screen projection on the to-be-projected images collected by each virtual camera on independent display areas.

2. The screen projection method according to claim 1, wherein the receiving a to-be-projected video stream sent by a screen projection initiator comprises:

establishing a protocol interaction with the screen projection initiator based on a screen projection protocol to which the to-be-projected video stream belongs; and after establishing the protocol interaction, receiving the to-be-projected video stream sent by the screen projection initiator.

3. The screen projection method according to claim 1, wherein the standard camera interface comprises camera api2.

4. The screen projection method according to claim 1, further comprising: when detecting that to-be-projected video streams sent by a plurality of screen projection initiators are received, decoding each of the to-be-projected video streams to generate a plurality of to-be-projected images corresponding to each of the to-be-projected video streams;

splicing to-be-projected images that are at a same time point among the to-be-projected video streams to generate a plurality of spliced to-be-projected images;

creating one virtual camera to enable the videoconferencing screen projection application to control the one virtual camera through the standard camera interface to collect the spliced to-be-projected images; and performing the screen projection on the collected spliced to-be-projected images by the videoconferencing screen projection application.

5. A videoconferencing device, configured to execute the screen projection method according to claim 1.

6. A screen projection system, comprising a screen projection initiator and the videoconferencing device according to claim 5, wherein the screen projection initiator is configured to send a to-be-projected video stream to the videoconferencing device.

7. A videoconferencing device, configured to execute the screen projection method according to claim 2.

8. A screen projection system, comprising a screen projection initiator and the videoconferencing device according to claim 7, wherein the screen projection initiator is configured to send a to-be-projected video stream to the videoconferencing device.

9. A videoconferencing device, configured to execute the screen projection method according to claim 3.

10. A screen projection system, comprising a screen projection initiator and the videoconferencing device according to claim 9, wherein the screen projection initiator is configured to send a to-be-projected video stream to the videoconferencing device.

11. A videoconferencing device, configured to execute the screen projection method according to claim 4.

12. A screen projection system, comprising a screen projection initiator and the videoconferencing device according to claim 11, wherein the screen projection initiator is configured to send a to-be-projected video stream to the videoconferencing device.

* * * * *